United States Patent
Tang et al.

(10) Patent No.: US 8,027,366 B1
(45) Date of Patent: Sep. 27, 2011

(54) TECHNIQUE FOR REDUCING PHYSICAL LAYER (PHY) OVERHEAD IN WIRELESS LAN SYSTEMS

(75) Inventors: Hsiao-Cheng Tang, Milpitas, CA (US); Ravi Narasimhan, Los Altos, CA (US); Hemanth Sampath, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/703,288

(22) Filed: Feb. 10, 2010

Related U.S. Application Data

(63) Continuation of application No. 10/832,711, filed on Apr. 26, 2004, now Pat. No. 7,701,975.

(60) Provisional application No. 60/523,439, filed on Nov. 19, 2003.

(51) Int. Cl.
*H04L 12/56* (2006.01)
*H04J 1/16* (2006.01)

(52) U.S. Cl. ......... 370/474; 370/252; 370/338; 370/339

(58) Field of Classification Search .................. 370/474, 370/252, 338, 389
See application file for complete search history.

(56) References Cited

U.S. PATENT DOCUMENTS

| | | | |
|---|---|---|---|
| 6,614,808 B1 * | 9/2003 | Gopalakrishna | 370/469 |
| 7,043,541 B1 | 5/2006 | Bechtolsheim et al. | |
| 2003/0169769 A1 * | 9/2003 | Ho et al. | 370/473 |
| 2003/0169790 A1 | 9/2003 | Chieng et al. | |
| 2005/0068900 A1 | 3/2005 | Stephens et al. | |

OTHER PUBLICATIONS

"Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)", IEEE Std 802.11e/D5.0 (Jul. 2003).

"Part 16: Air Interface for Fixed Broadband Wireless Access Systems", IEEE 802.16, Amendment 2: Medium Access Control Modifications and Additional Physical Layer Specifications for 2-11 GHz (2004).

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g/D8.2 (Apr. 2003).

"Part 11: Wireless LAN Medium Access Control (MAC) and Physical Layer (PHY) specifications: Amendment 5: Spectrum and Transmit Power Management Extensions in the 6 GHz band in Europe" IEEE Std. 802.11h, 2003.

(Continued)

*Primary Examiner* — John Pezzlo

(57) ABSTRACT

A physical layer (PHY) packet aggregation technique may be used to reduce the percentage of PHY overhead in data transmission in order to achieve better PHY efficiency and higher throughput. Higher layer packets in an upper layer data queue may be fragmented into appropriate small-size sub-packets, which include a body encapsulated by a MAC header and an FCS field. The sub-packets are then concatenated to form the data field of an aggregated PHY packet. Since each of the sub-packets contains its own MAC (Media Access Control) header and FCS (Frame Check Sequence) field, the receiver can identify and flag erroneous sub-packets on an individual basis. The receiver may transmit a block ACK, which includes the acknowledgement status for each of the sub-packets in the aggregated PHY packet, to the transmitter. The transmitter may resend only the erroneous sub-packet(s).

20 Claims, 8 Drawing Sheets

OTHER PUBLICATIONS

"Part 11: Wireless LAN Medium Access Control (MAC) and Physical Layer (PHY) specifications: Amendment 6: Medium Access Control (MAC) Security Enhancements," IEEE Std. 802.11i, 2004.

"Part 11: Wireless LAN Medium Access Control (MAC) and Physical Layer (PHY) specifications: Higher-Speed Physical Layer Extension in the 5 GHz Band", IEEE Std 802.11a, 1999.

"Part 11: Wireless LAN Medium Access Control (MAC) and Physical Layer (PHY) specifications: Higher-Speed Physical Layer Extension in the 2.4 GHz Band", IEEE Std. 802.11b, 1999.

"Technical Specification for the MAC and PHY layer of the TGn Synch Proposal to IEEE 802.11 TGn", IEEE Std. 802.11-04/0889r6 (May 2005).

Draft 802.20 Permanent Document, "System Requirements for IEEE 802.20 Mobile Broadband Wireless Access Systems—Version 14", IEEE 802.20-PD-06 (Jul. 16, 2004).

Youngsoo Kim et al., "Throughput Enhancement via Frame Aggregation—A Sequel", IEEE 802.11-03/567r0 (May 2003).

* cited by examiner

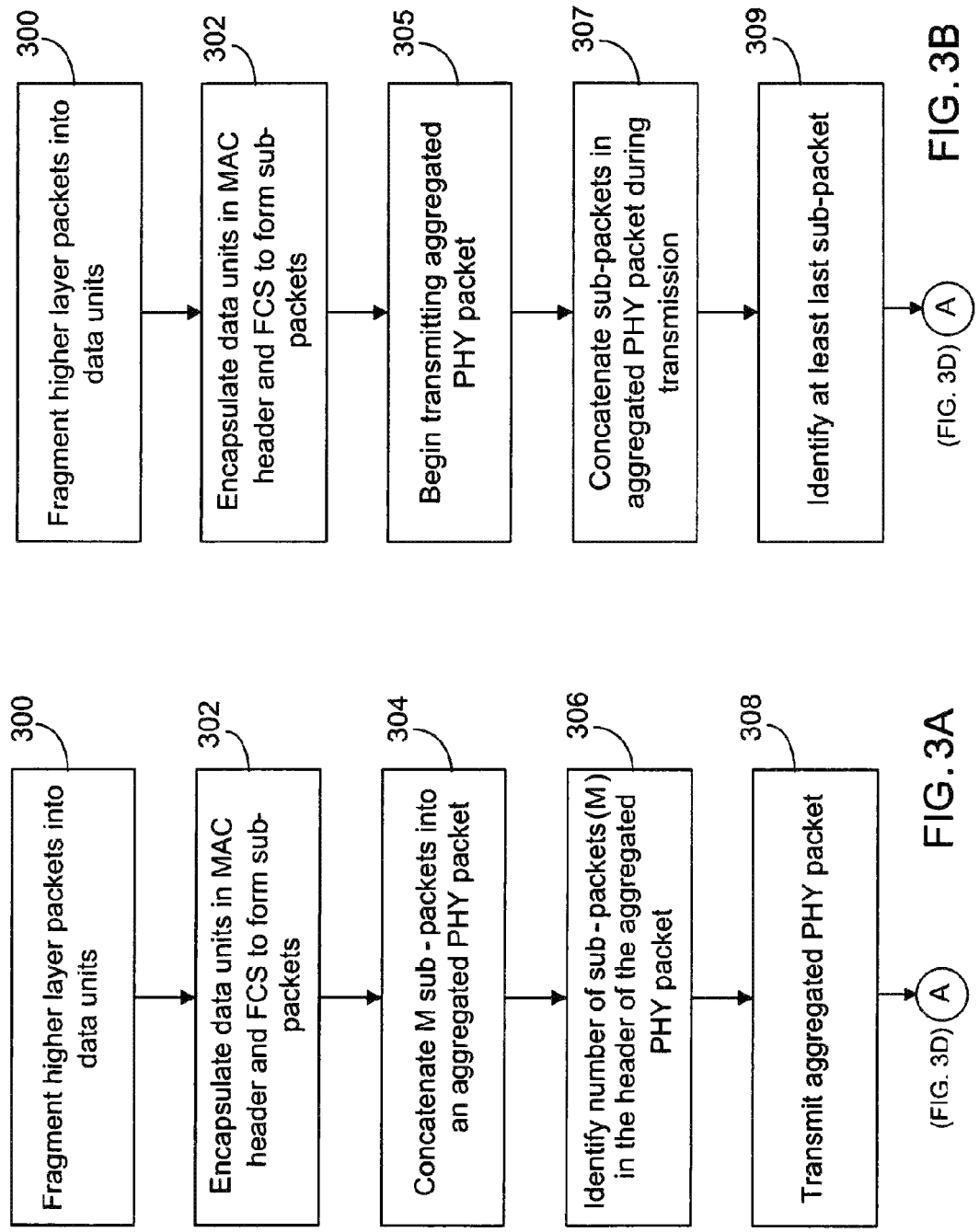

TECHNIQUE FOR REDUCING PHYSICAL LAYER (PHY) OVERHEAD IN WIRELESS LAN SYSTEMS

CROSS-REFERENCE TO RELATED APPLICATIONS

This application is a continuation of U.S. application Ser. No. 10/832,711, filed Apr. 26, 2004 now U.S. Pat. No. 7,701,975, and claims to the benefit of U.S. Provisional Application Ser. No. 60/523,439, filed on Nov. 19, 2003.

BACKGROUND

The IEEE (Institute of Electrical and Electronics Engineers) 802.11 family of standards (including IEEE 802.11, 802.11a, 802.11b, 802.11g and 802.11n) specify over-the-air interfaces in a wireless LAN (Local Area Network), e.g., between a wireless client and a base station or another wireless client. The IEEE 802.11 standards place specifications on the parameters of both the physical (PHY) and medium access control (MAC) layers of the network. The PHY layer, which handles the actual transmission of data between nodes, may use direct sequence spread spectrum (DSSS), frequency hopping spread spectrum (FHSS), or infrared (IR) pulse position modulation. The MAC layer uses a set of protocols to manage and maintain communication between 802.11 clients/stations by coordinating access to the shared wireless medium. The MAC layer is responsible for performing a number of functions including scanning, authentication, and association.

The IEEE 802.11g standard specifies fixed PHY (Physical Layer) overheads for each data packet regardless of packet size or data rate. Therefore, the percentage of PHY overhead with respect to packet duration is larger for packets with fewer data bits or a higher PHY data rate. Furthermore, the percentage of PHY overhead (with respect to the transmission time for a data packet) may increase for the next generation wireless LANs. For example, the proposed IEEE 802.11n specification (directed to high throughput wireless LANs) seeks to improve the PHY data rate by a factor of three or four, but the preamble and signal fields in the header will still be transmitted at low data rates for high reliability. As a result, the transmission time for each data packet will become small, increasing the percentage of PHY overhead.

SUMMARY

A physical layer (PHY) packet aggregation technique may be used to reduce the percentage of PHY overhead in data transmission in order to achieve better PHY efficiency and higher throughput. Higher layer packets in an upper layer data queue may be fragmented into data units, e.g., an MPDU (MAC Protocol Data Unit). Each of the data units may be encapsulated by a MAC header and FCS (Frame Check Sequence) field to form a corresponding number of sub-packets. Each sub-packet may also include a scrambler field and a tail field.

The sub-packets are then concatenated to form the data field of an aggregated PHY packet. An indicator identifying the number of the sub-packets in the aggregated PHY packet may be included in the header of the aggregated PHY packet or an indicator may be added to at least a last sub-packet in the aggregated PHY packet to identify the last sub-packet to the receiver.

Since each of the sub-packets contains its own MAC (Media Access Control) header and FCS (Frame Check Sequence) field, the receiver can identify and flag erroneous sub-packets on an individual basis. The receiver may transmit an individual acknowledgement (ACK) for each sub-packet or a block ACK, which includes the acknowledgement status for each of the sub-packets in the aggregated PHY packet, to the transmitter. The transmitter may resend only the erroneous sub-packet(s).

The PHY packet aggregation technique may be utilized in a wireless LAN system, e.g., a system complying with one of the IEEE 802.11 (including 802.11, 802.11a, 802.11b, 802.11g and 802.11n), IEEE 802.16 (including 802.16, 802.16a and 802.16b), and 802.20 families of standards. The technique may be implemented in a MIMO (Multiple-In Multiple-Out) systems, MISO (Multiple-In Single-Out) systems, SIMO (Single-In Multiple-Out) systems, and SISO (Single-In Single-Out) systems.

BRIEF DESCRIPTION OF THE DRAWINGS

FIG. 3A is a flowchart describing operations performed by a transmitter in a PHY packet aggregation technique according to an embodiment.

FIG. 3B is a flowchart describing operations performed by a transmitter in a PHY packet aggregation technique according to an alternative embodiment.

DETAILED DESCRIPTION

Figure 1:
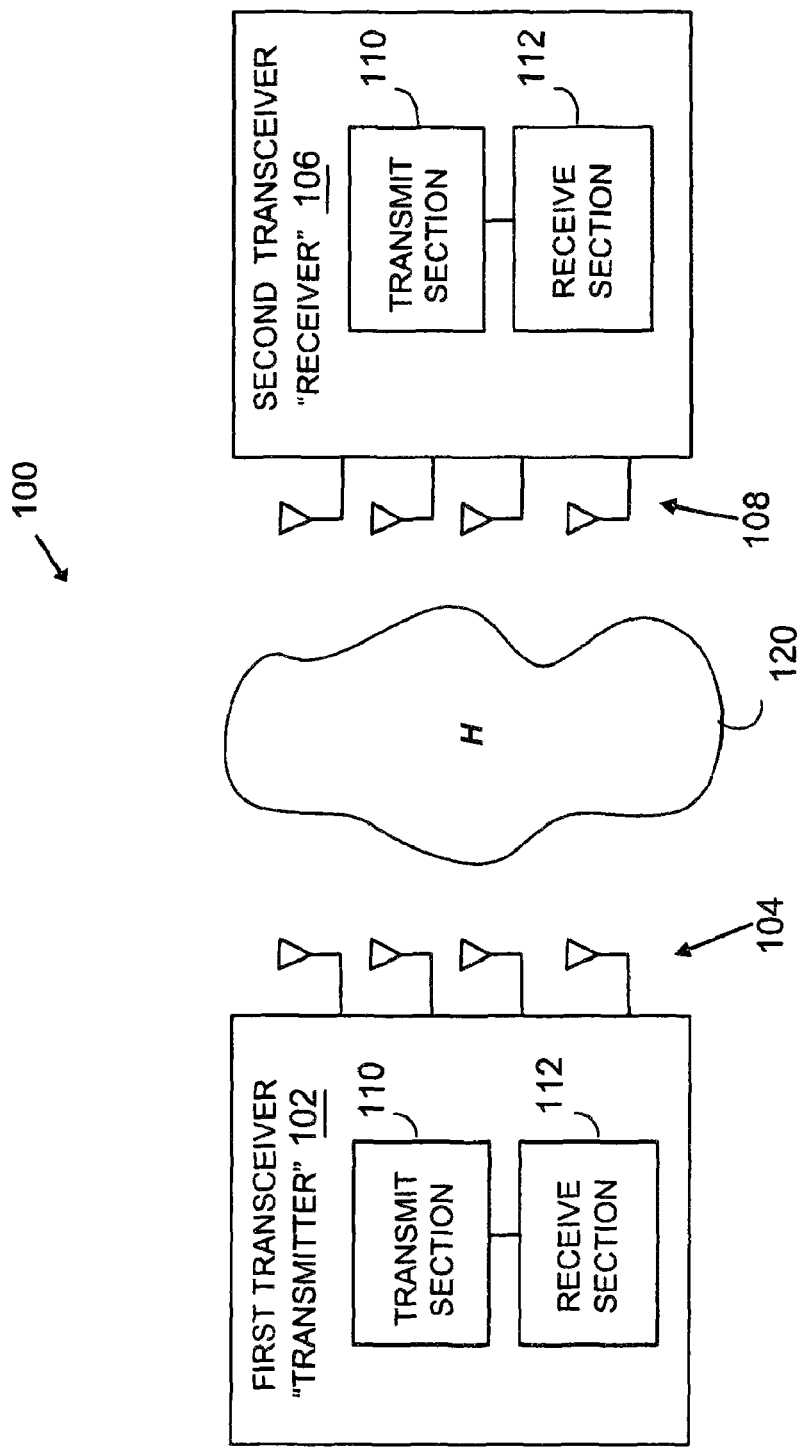
FIG. 1 is a block diagram of a wireless multiple-in-multiple-out (MIMO) communication system.

FIG. 1 illustrates a wireless multiple-in-multiple-out (MIMO) communication system 100, which includes a first transceiver 102 with $M_T$ transmit ($T_x$) antennas 104 and a second transceiver 106 with $M_R$ receive ($R_x$) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data. The antennas in the transmitter 102 and receiver 106 communicate over channels in a wireless medium. In FIG. 1, H 120 represents the reflections and multi-paths in the wireless medium The wireless system may operate in compliance with one of the IEEE 802.11 family of standards (including IEEE 802.11, 802.11a, 802.11b, 802.11g and 802.11n). The IEEE 802.11 family of standards specify over-the-air interfaces in a wireless LAN (Local Area Network), e.g., between a wireless client and a base station or another wireless client. The IEEE 802.11 standards place specifications on the parameters of both the physical (PHY) and medium access control (MAC) layers of the network. The PHY layer, which handles the actual transmission of data between nodes, may use direct sequence spread spectrum (DSSS), frequency hopping spread spectrum (FHSS), or infrared (IR) pulse position modulation. The MAC layer uses a set of protocols to manage and maintain communication between 802.11 stations by coordinating access to the shared wireless medium. The MAC layer is responsible for determining a number of functions including scanning, authentication, and association.

Figure 2:
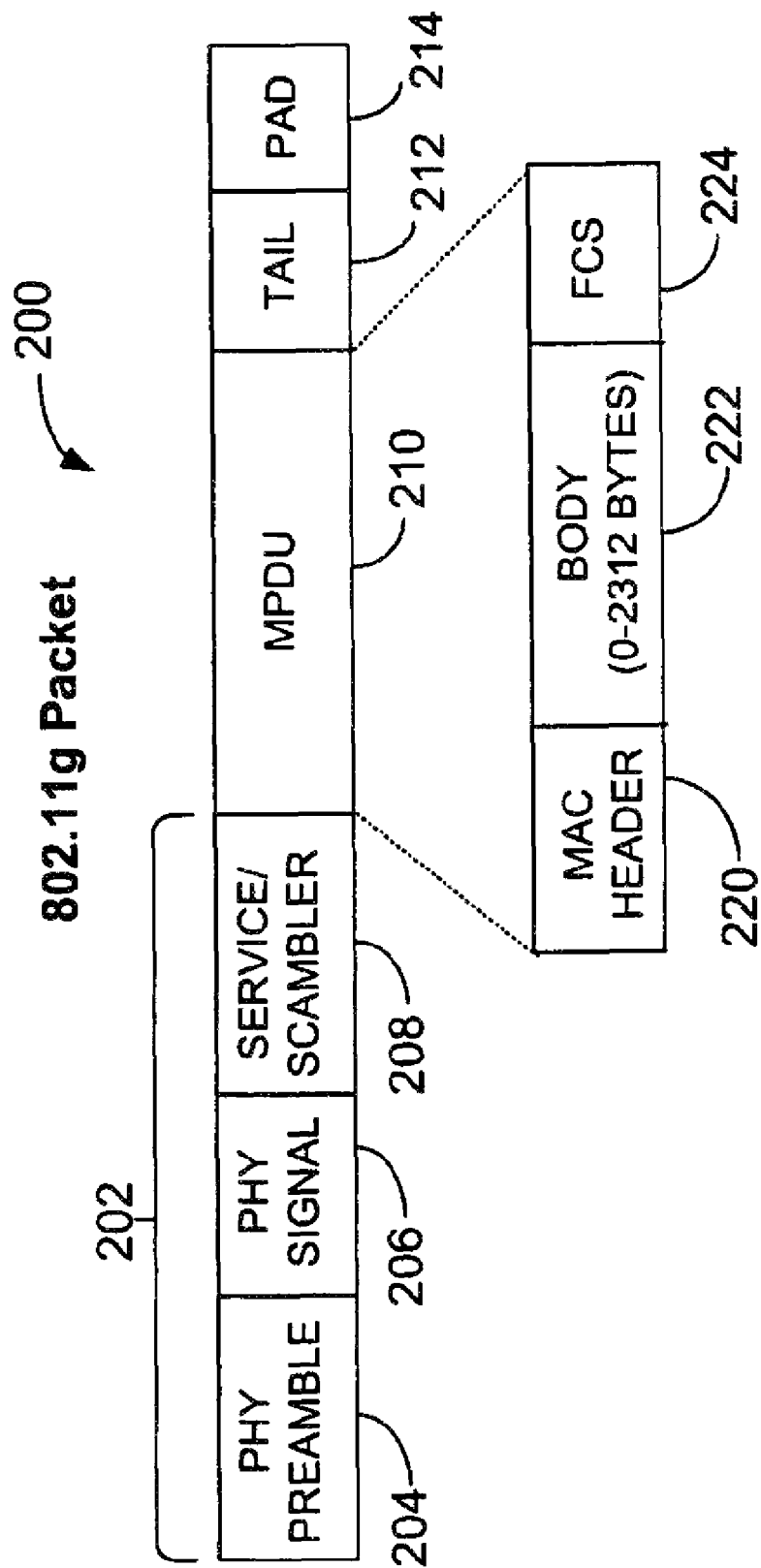
FIG. 2 illustrates a PHY packet format conforming to the IEEE 802.11g specification.

FIG. 2 illustrates the PHY packet format specified by the IEEE 802.11g standard. The PHY packet 200 includes a PHY header 202, which includes a preamble 204, signal field 206, and service/scrambler field 208, an MPDU (MAC Protocol Data Unit) 210, a tail field 212, and a PAD field 214. The preamble 204 is used to acquire the incoming OFDM (Orthogonal Frequency Division Multiplexing) signal, and train and synchronize the demodulator. The signal field 206 contains information about the rate and length of the PHY packet. The service/scrambler field 208 is used to synchronize the descrambler in the receiver. The tail field 212 is used for receiver processing functions. The PAD field 214 contains a number of bits used to modify the frame size to equal a specific multiple of bits coded in an OFDM symbol.

The MPDU 210 is the unit of data exchanged between two peer MAC entities using the services of the PHY layer. The MPDU 210 includes a MAC header 220, a body 222, and a FCS (Frame Check Sequence) field 224, which is used for error detection.

The IEEE 802.11g standard specifies fixed PHY overheads for each data packet regardless of packet size or data rate. Therefore, the percentage of PHY overhead with respect to packet duration is larger for packets with fewer data bits or a higher PHY data rate.

Figure 3C:
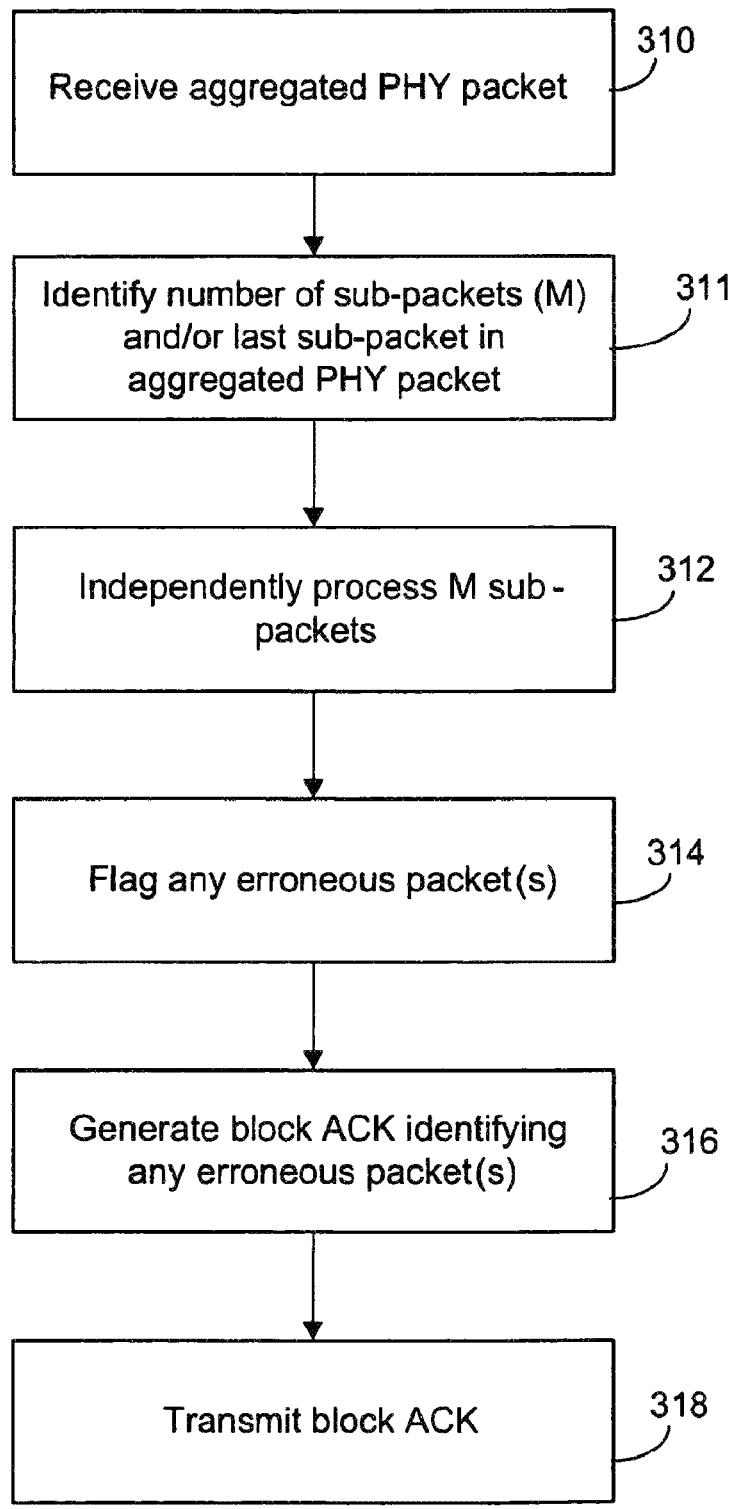
FIG. 3C is a flowchart describing operations performed by a receiver in a PHY packet aggregation technique according to an embodiment.
Figure 3D:
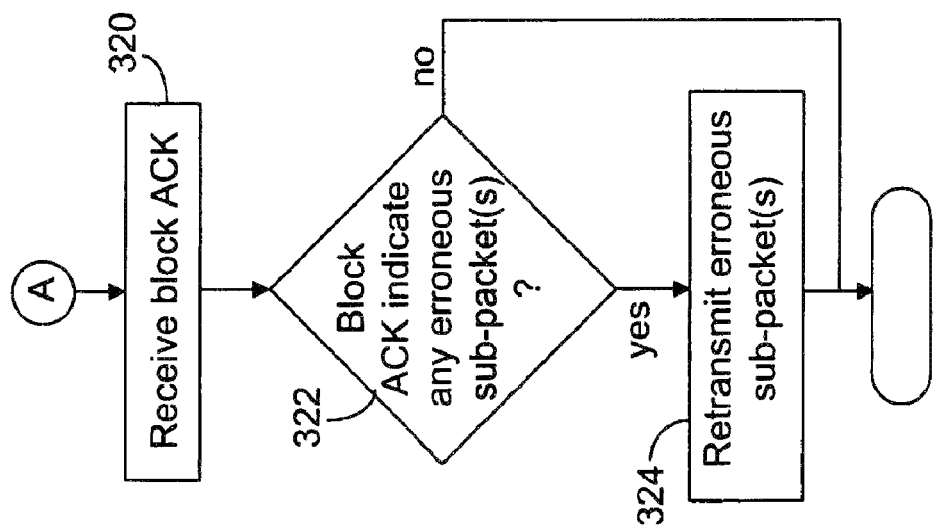
FIG. 3D is a flowchart describing operations performed by a transmitter in PHY packet aggregation according to an embodiment.
Figure 4:
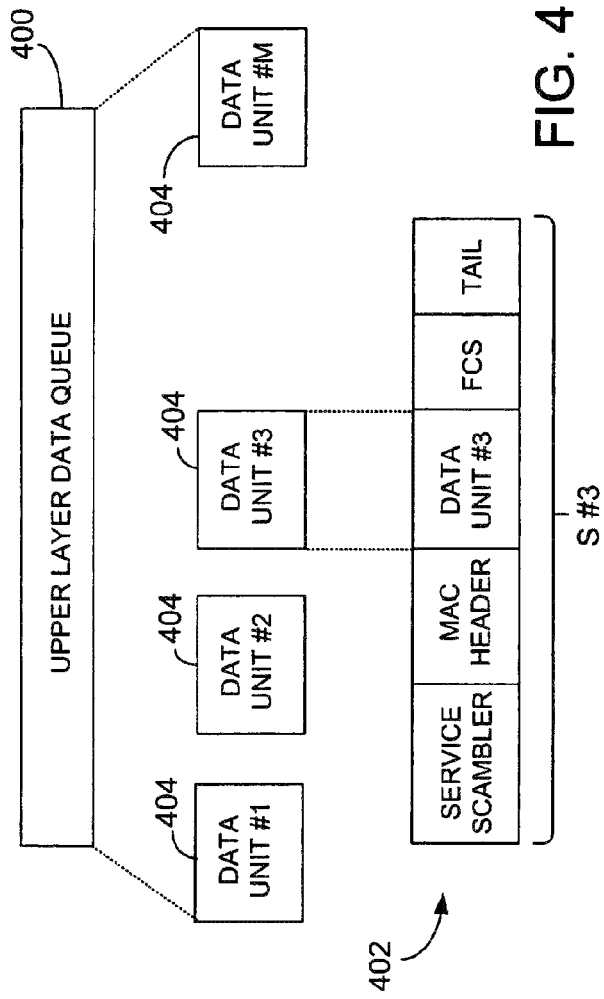
FIG. 4 illustrates sub-fragmentation of higher level packets into smaller sized sub-packets for aggregation into an aggregated PHY packet according to an embodiment.
Figure 7:
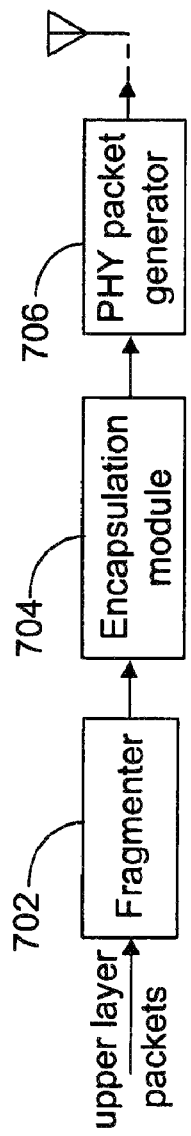
FIG. 7 is a block diagram of a portion of the transmit section according to an embodiment.

In an embodiment, a PHY packet aggregation technique is used to reduce the percentage of PHY overhead in data transmission in order to achieve better PHY efficiency and higher throughput. FIGS. 3A-3D are flowcharts describing a PHY packet aggregation and acknowledgement technique according to an embodiment. FIGS. 3A, 3B, and 3D show operations performed by the transmit section 110 of the transmitter 102, and FIG. 3C shows operations performed by the receive section 112 of the receiver 104. FIG. 7 is a block diagram showing a portion of the transmit section 110 in greater detail The transmit section may include a packet fragmenter 702 to fragment higher layer packets in an upper layer data queue 400 into appropriate small-size data units 404, as shown in FIG. 4 (block 300). An encapsulation module 704 may encapsulate each data unit 404 by appending a MAC header 406 and an FCS field 408 to form a sub-packet (S) (block 302). Other fields, such as, a service/scrambler field 410 and a tail field 412, may be appended to each sub-packet.

Figure 5:
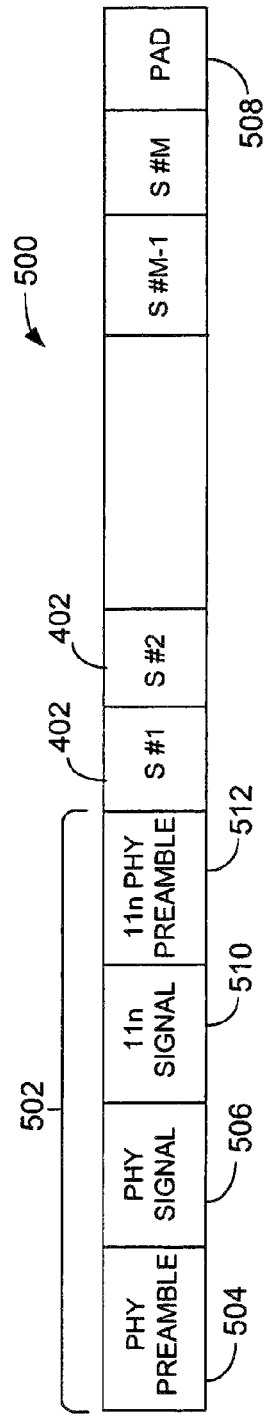
FIG. 5 illustrates an aggregated PHY packet format according to an embodiment.

The sub-packets 402, with any appended field, are then concatenated by a PHY packet generator 706 to form the data field of an aggregated PHY packet 500 (block 304), as shown in FIG. 5. The aggregated PHY packet 500 may include a header 502, which may include a preamble 504 and a signal field 506, and a PAD field 508. The aggregated PHY packet may omit the service/scrambler 208 and tail 212 fields of a standard PHY packet if these are included in the individual sub-packets. For IEEE 802.11n systems, the PHY header 502 may also include an 802.11n PHY signal field 510 and an 802.11n preamble 512.

The length of the aggregated PHY packet may be selected based on several parameters. These parameters may include channel coherence time, channel availability (TXOP (Transmission Opportunity)), and quality of service (QoS) requirements such as delay and latency constraints. In an embodiment, the aggregated PHY packet may be less than 1/X of the channel coherence (which is inversely proportional to the Doppler spread of the channel), where X is a programmable number. For example, for X=20, a 10 Hz Doppler dictates that the packet length should be less than $\frac{1}{20} \times 0.1$ sec=5 msec. The length of the aggregated PHY packet may dictate the number (M) of sub-packets 402 in the aggregated PHY packet.

The number (M) of sub-packets in the aggregated PHY packet may be identified in the PHY Signal field 506 (block 306). This information may be used to indicate to the MAC receiver the number of sub-packets that need to be processed, since at the MAC layer the sub-packets may be treated as individual packets. The aggregated PHY packet may then be transmitted to the receiver 104 (block 308).

In an embodiment, the number (M) of sub-packets in the aggregated PHY packet may not be known ahead of time, and due to hardware, firmware, and/or software buffer size constraints one may choose to aggregate sub-packets on the fly while the aggregated packet is being transmitted. In this case, the number (M) can not be specified at the PHY Signal field. As shown in FIG. 3B, which describes such an alternative embodiment, the transmit section begins transmission of the aggregated PHY packet before all sub-packets have been concatenated (block 305). The sub-packets may be aggregated on the fly, during transmission of the aggregated PHY packet (block 307). The transmit section 110 may signal each sub-packet, or at least the last sub-packet (block 309). Each sub-packet may be signaled by inserting, e.g., three unscrambled repeating bits before each sub-packet to indicate whether this is the last sub-packet in the aggregated packet. The receiver may use a majority rule method to decode the 3-bit repetition code to decide whether to continue receiving or stop, having reached the last sub-packet of the aggregated packet. Alternatively, a terminating sequence may be inserted after the last sub-packet. The receiver would then process the packet until detection of the terminating sequence.

Figure 8:
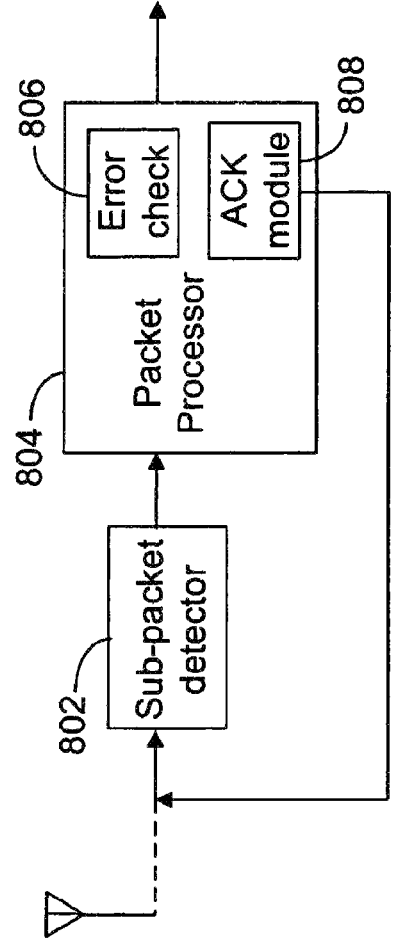
FIG. 8 is a block diagram of a portion of the receive section according to an embodiment.

The receiver 104 receives the aggregated PHY packet (block 310, FIG. 3B). FIG. 8 is a block diagram showing a portion of the receive section 112 in greater detail. The receiver section 112 may include a sub-packet detector 802 to determine the number of sub-packets and/or last sub-packet in the aggregated PHY packet (block 311). The receiver may include a packet processor 804, which may process the sub-packets independently (block 312). Since each of the sub-packets 402 contains its own MAC header and FCS field, the receiver can identify and flag erroneous sub-packets on an individual basis (block 314). The packet processor 804 may include an error checking module 806 to perform this function. An acknowledgment (ACK) module 808 in the receiver 104 may then generate ACKs for the individual sub-packets and forward the ACKs for transmission to the transmitter 102. An additional MAC protocol may be defined to handle multiple ACKs from a single data packet.

In an embodiment, the receiver 104 may generate a "block ACK" that identifies any erroneous sub-packet(s) in the aggregated PHY packet (block 316). The IEEE 802.11e standard describes one type of block ACK. The transmitter may transmit a block ACK request frame after transmitting the aggregated PHY packet. The receiver then transmits the block ACK, which includes the acknowledgement status for each of the sub-packets in the aggregated PHY packet, to the transmitter 102 (block 318).

The transmitter 102 receives and inspects the block ACK (block 320, FIG. 3A) to determines whether the block ACK indicates any erroneous sub-packet(s) (block 322). If so, the transmitter may resend the erroneous sub-packet(s) individually (and expect individual ACKs) or in another aggregated PHY packet (block 324).

Figure 6:
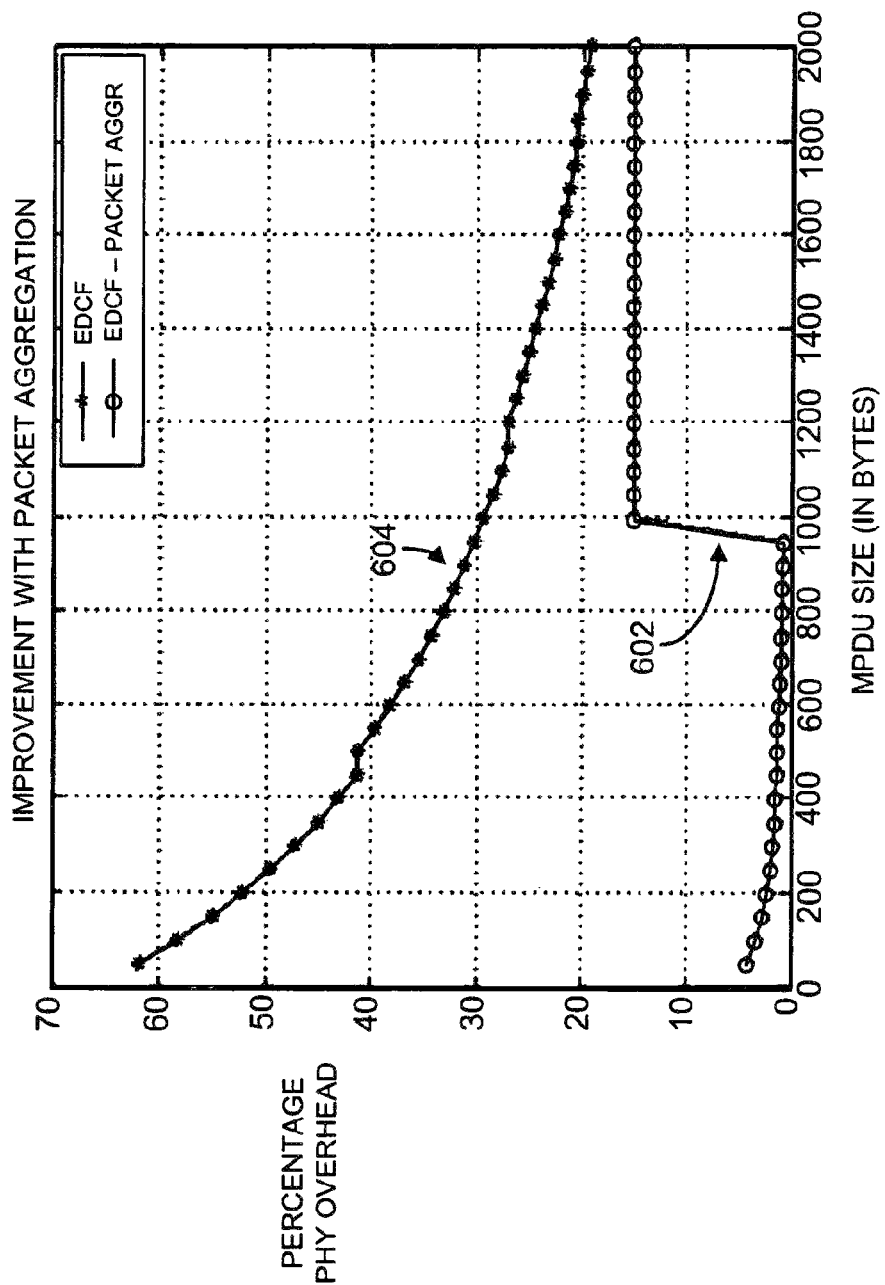
FIG. 6 is a plot showing simulation results.

FIG. 6 shows the results of a simulation comparing the percentage of PHY overhead obtained with the packet aggregation scheme 602 and without the packet aggregation scheme 604 (as a function of packet size). The simulation was of a 3×3 MIMO 802.11n system using an EDCF (Enhanced Distributed Coordination Function) MAC protocol (802.11e MAC). The following assumptions were made: PHY data rate=54*3=162 Mbps; Doppler=10 Hz, leading to a channel coherence time of 100 msec and a maximum aggregated PHY packet spanning a maximum of 5 msec; sub-packet 402 body size (data unit 404)=MPDU body size; EDCF protocol is implemented with the block ACK feature enabled; and transmission assumes a queue with 64 MPDUs. As the plot shows, the packet aggregation scheme resulted in significant overhead improvement for the entire range of packet size.

The components of the transmit section 110 and receive section 112 shown in FIGS. 7 and 8, respectively, can be realized in digital electronic circuitry, integrated circuitry, specially designed ASICs (application specific integrated circuits), computer hardware, firmware, software, and/or combinations thereof.

The packet aggregation scheme may be implemented in MIMO, MISO (Multiple-In Single-Out), SIMO (Single-In Multiple-Out), and SISO (Single-In Single-Out) systems.

The packet aggregation and acknowledgement techniques described may be implemented in any packet-based wireless systems, e.g., systems compliant with IEEE 802.11 (including IEEE 802.11, 802.11a, 802.11b, 802.11g and 802.11n), 802.16 (including 802.16, 802.16a and 802.16b), and 802.20 family of standards.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

We claim:

1. A device comprising:
an encapsulation module configured to receive a plurality of data units and add one or more fields including at least one field associated with error detection to each data unit to form a plurality of sub-packets;
a packet generator configured to aggregate the plurality of sub-packets to form a data field of an aggregate packet; and
a transmit section configured to transmit the aggregate packet.

2. The device of claim 1, where the encapsulation module further adds a medium access control (MAC) layer header to each data unit; and
where the packet generator aggregates the plurality of sub-packets each containing the MAC layer header and the at least one field associated with error detection to form the data field.

3. The device of claim 1, where the encapsulation module further adds to the aggregate packet a signal field indicative of a number of sub-packets requiring processing by a receiver; and
where the transmit section transmits the aggregate packet containing the data field and the signal field to the receiver.

4. The device of claim 1, where the encapsulation module inserts position information associated with each sub-packet, the position information indicative of a position of a corresponding sub-packet in the data field.

5. The device of claim 4, where the position information includes three unscrambled repeating bits.

6. The device of claim 1, where the at least one field associated with error detection is a frame check sequence field.

7. The device of claim 1, where the encapsulation module adds a physical layer (PHY) header including an 802.11n PHY signal field and a 802.11n preamble to the aggregate packet.

8. The device of claim 1, further comprising a receive section configured to receive a message from a receiver processing the aggregate packet, the message identifying one or more erroneous sub-packets in the aggregate packet received by the receiver,
where the transmit section re-transmits one or more sub-packets corresponding to the one or more identified erroneous sub-packets to the receiver.

9. A device comprising:
a detector configured to receive an aggregate packet containing a plurality of sub-packets each having at least one field associated with error detection; and
a packet processor configured to perform one or more operations associated with error detection on each sub-packet in the aggregate packet using the at least one field, and to generate one or more indicators for the plurality of sub-packets indicating a result of the one or more performed operations.

10. The device of claim 9, where the detector determines a number of sub-packets in the aggregate packet including a position of each sub-packet, and identifies whether all sub-packets associated with the aggregate packet have been received based on the number and position.

11. The device of claim 9, where the packet processor is configured to identify one or more erroneous sub-packets in the aggregate packet, and generate an indicator for each erroneous sub-packet indicative of one or more errors associated with the corresponding erroneous sub-packet.

12. A method comprising:
receiving a plurality of data units;
adding one or more fields including at least one field associated with error detection to each data unit to form a plurality of sub-packets;
aggregating the plurality of sub-packets to form a data field; and
generating an aggregate packet based on the data field.

13. The method of claim 12, where adding the one or more fields further includes adding a medium access control (MAC) layer header to each data unit; and
where aggregating the plurality of sub-packets includes aggregating the plurality of sub-packets each containing the MAC layer header and the at least one field associated with error detection to form the data field.

14. The method of claim 12, further comprising:
adding a physical layer (PHY) signal field to the aggregate packet; and
transmitting the aggregate packet containing the PHY signal field to a receiver.

15. The method of claim 14, where adding the PHY signal field includes:

determining a packet length indicative of a number of sub-packets in the data field;

inserting the determined packet length into the PHY signal field; and adding the PHY signal field to the aggregate packet.

16. The method of claim 15, where determining the packet length is performed based on channel coherence and Doppler spread of a channel through which the aggregate packet is to be transmitted.

17. The method of claim 12, further comprising:

adding to the aggregate packet a signal field indicative of a number of sub-packets requiring processing by a receiver; and transmitting the aggregate packet containing the data field and the signal field to the receiver.

18. The method of claim 12, where adding the one or more fields further includes inserting position information before each sub-packet, the position information indicative of a position of a corresponding sub-packet.

19. The method of claim 18, where adding the one or more fields further includes adding a frame check sequence field to each data unit to form the plurality of sub-packets; and where inserting the position information includes inserting three unscrambled repeating bits to each sub-packet containing the frame check sequence field.

20. The method of claim 12, where receiving the plurality of data units includes receiving a first set of data units and a second set of data units;

where aggregating the plurality of sub-packets includes aggregating sub-packets corresponding to the first set of data units to form a first data field, and sub-packets corresponding to the second set of data units to form a second data field; and where aggregating the sub-packets corresponding to the second set of data units is performed while transmitting the sub-packets containing the first data field to a receiver using the aggregate packet.

* * * * *